United States Patent
Kanbe et al.

(10) Patent No.: US 7,051,696 B2
(45) Date of Patent: May 30, 2006

(54) BEARING STRUCTURE OF CRANKSHAFT IN INTERNAL COMBUSTION ENGINE

(75) Inventors: Takashi Kanbe, Saitama (JP); Hidemi Yokoyama, Saitama (JP); Yu Oba, Saitama (JP); Akira Takahashi, Saitama (JP); Teruo Kihara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/927,060

(22) Filed: Aug. 27, 2004

(65) Prior Publication Data

US 2005/0078895 A1    Apr. 14, 2005

(30) Foreign Application Priority Data

Sep. 30, 2003 (JP) .............................. 2003-339416
Sep. 30, 2003 (JP) .............................. 2003-339418

(51) Int. Cl.
*F02F 7/00* (2006.01)
*F16C 35/00* (2006.01)

(52) U.S. Cl. .................... 123/195 R; 384/432
(58) Field of Classification Search ............ 123/195 R, 123/195 C, 195 H, 196 R, 197.1, 197.4; 384/432, 429, 278, 294

See application file for complete search history.

(56) References Cited

U.S. PATENT DOCUMENTS 5,609,422 A * 3/1997 Mueller et al. ............. 384/278

FOREIGN PATENT DOCUMENTS

JP    2003-83080 A    3/2003
JP    2004116705 A *  4/2004

* cited by examiner

*Primary Examiner*—Henry C. Yuen
*Assistant Examiner*—Hyder Ali
(74) *Attorney, Agent, or Firm*—Birch, Stewart, Kolasch & Birch, LLP

(57) ABSTRACT

A bearing structure of a crankshaft in an internal combustion engine supports a crankshaft on a crankcase with rolling bearings includes a play absorbing device for absorbing the play in the radial direction generated between an outer race of the rolling bearing and a bearing hole of the crankcase. The play absorbing device includes a push plug which pushes an outer race of the ball bearing in the direction perpendicular to an axis of the crankshaft. The push plug is arranged in parallel to the crankshaft between the cylinder and the crankshaft. The outer race of the ball bearing is resiliently biased toward a side of the bearing hole of the crankcase which receives an explosion pressure. As a result, the generation of a hitting sound which is attributed to the above-mentioned "play" can be largely reduced even with respect to an internal combustion engine with a high explosion pressure.

18 Claims, 9 Drawing Sheets

BEARING STRUCTURE OF CRANKSHAFT IN INTERNAL COMBUSTION ENGINE

CROSS-REFERENCE TO RELATED APPLICATION

The present application claims is related to Japanese Patent Application Nos. 2003-339418 and 2003-339416, both filed Sep. 30, 2003, the entire contents of which are hereby incorporated by reference.

BACKGROUND OF THE INVENTION

1. Field of the Invention

The present invention relates to the structure of a bearing which rotatably supports a crankshaft in a crankcase.

2. Description of Background Art

In general, with respect to a single-cylinder internal combustion engine of a motorcycle or the like, a crankshaft is rotatably and pivotally supported in a bearing hole of a crankcase by way of a pair of rolling bearings, a piston which is slidably fit in a cylinder bore is connected to a crankpin of the crankshaft by way of a connecting rod, and an explosion pressure applied to the piston is received by the crankcase by way of the pair of rolling bearings from the crankshaft. In this case, it is desirable to ensure the smooth and light rotation of the crankshaft by maintaining a desired bearing function in such a manner that outer races and inner races of the above-mentioned pair of rolling bearings are press-fit into a bearing hole of the crankcase and a journal shaft portion of the crankshaft respectively thus preventing the occurrence of a hitting sound attributed to a play between the bearing hole and the journal shaft portion.

However, when the pair of left and right rolling bearings are press-fit into both of the crankshaft and the crankcase as mentioned above, there arises a drawback that the assembling of the crankshaft to the crankcase and the maintenance after the assembling become difficult.

Accordingly, conventionally, to overcome such a drawback, as shown in FIG. 9, at the time of assembling the crankshaft 6 to the crankcase 10, 11, before incorporating the crankshaft 6 into the crankcase 10, 11, the outer race 23 of the right-side rolling bearing BBr is preliminarily press-fit into a right-side crankcase two-split body 11 and, at the same time, the inner race 22 of the left-side rolling bearing BBl is press-fit into a left-side journal shaft portion 6l of the crankshaft 6. Further, at the time of assembling the crankshaft 6, the right-side journal shaft portion 6r of the crankshaft 6 is press-fit into the inner race 26 of the right-side rolling bearing Br (the outer race being already press-fit into the right-side crankcase two-split body). Subsequently, the outer race 23 of the left-side rolling bearing BBl in which the inner race 22 has been already press-fit into the left-side journal shaft portion 6l of the crankshaft 6 is loosely fit into (with a play) the left-side crankshaft two-split body 10 so as to facilitate the assembling of the crankshaft 6 to the crankcase 10, 11 and to facilitate the maintenance thereafter.

However, in such an operation, a phenomenon that some play is generated in the radial direction between the outer race 23 of the left-side rolling bearing BBl and the bearing hole of the crankcase 10, 11 is unavoidable. Accordingly, at the time of running the internal combustion engine, there arises a drawback that a desired bearing function cannot be obtained besides the occurrence of a hitting sound attributed to the above-mentioned play.

Accordingly, in Patent Document JP-A-2003-83080 (shown herein in FIG. 10 of this application), there has been proposed a technique in which an outer surface of either one (left-side) outer race of a pair of ball bearings BBl is pushed in the axial direction by a push plug 30 having an inclined push surface so as to absorb the above-mentioned "play".

However, with respect to the technique described in the above-mentioned Patent Document JP-A-2003-83080, the above-mentioned push plug 30 is arranged at a side opposite to the cylinder with the crankshaft sandwhiched between the push plug 30 and the cylinder, that is, the push plug is arranged at the crankcase side so as to push the outer race of the rolling bearing BBl toward the cylinder side of the bearing hole of the crankcase (the side opposite to the direction along which the explosion pressure is applied to the piston) and hence, the pushing direction becomes opposite to the explosion load applied to the piston. Accordingly, the absorption of the play by the push plug 30 becomes insufficient and hence, with respect to a high-output internal combustion engine which generates a large explosion force, the outer race of the rolling bearing BBl hits the side of the bearing hole of the crankcase opposite to the cylinder whereby there arises a drawback that a hitting-sound reduction effect cannot be sufficiently achieved.

Further, with conventional device described in the above-mentioned Patent Document JP-A-2003-83080 (shown herein FIG. 10 of this application), in the midst of assembling the push plug 30, the push plate PP which is pushed outwardly due to the coil spring 31 in a free enlongation state is disengaged from the positioning members PM and hence, the position of the push plug 30 is not determined whereby the operator has to assemble the push plug 30 while compressing the coil spring 31 or pushing the push plate with his hand thus giving rise to a drawback that the assembling is difficult and cumbersome.

SUMMARY AND OBJECTS OF THE INVENTION

The invention has been made in view of such circumstances and it is an object of the invention to provide a novel bearing structure of a crankshaft in an internal combustion engine which can overcome the above-mentioned drawbacks by allowing an outer race of a rolling bearing which supports a crankshaft to push a side of a bearing hole of a crankcase opposite to a cylinder.

To achieve the above-mentioned object, a first aspect of the invention described is directed to a bearing structure of a crankshaft in an internal combustion engine comprising a cylinder block and a crankcase which is integrally connected to the cylinder block, wherein a crankshaft which is connected with a piston slidably fitted in a cylinder of the cylinder block by way of a connecting rod in an interlocking manner is rotatably supported in a bearing hole of the crankcase by way of a rolling bearing and the bearing structure includes play absorbing means for preventing a play in the radial direction between the rolling bearing and the bearing hole, wherein the bearing structure has the first feature that the play absorbing means includes a push plug which pushes an outer race of the rolling bearing in the direction perpendicular to an axis of the crankshaft, the push plug is arranged parallel to the crankshaft between the cylinder and the crankshaft, and the outer race of the rolling bearing is resiliently biased toward a side of the bearing hole of the crankcase which receives an explosion pressure.

Further, to achieve the above-mentioned object, a second aspect of the invention includes a feature whereby the play absorbing means having the push plug is arranged to be more offset to a rotational direction front side of the crankshaft than a cylinder center axis of the cylinder.

Further too achieve the above-mentioned object, a third aspect of the invention is directed to a bearing structure of a crankshaft in an internal combustion engine in which a crankshaft is rotatably supported on a crankcase by way of a rolling bearing, play absorbing means is interposed between an outer race of the rolling bearing and the crankcase, and a play in the radial direction which is generated between the outer race of the rolling bearing and a bearing hole of the crankcase is absorbed by the play absorbing means, wherein the bearing structure has the first feature that the play absorbing means includes a push plug which is movably mounted in the crankcase and pushes an outer race of the rolling bearing in the radial direction of the crankshaft, a spring set plate which is fixed to the crankcase by a bolt, and a spring member which is interposed between the push plug and the spring set plate and resiliently biases the push plug toward the outer race, wherein the spring set plate includes a bent portion which is bent toward the crankcase and the bent portion is, when the spring member is in a free elongation state and the spring set plate is in a temporarily stopped state, engaged with a positioning portion which is formed on the crankcase thus enabling the positioning of the spring set plate.

Further, to achieve the above-mentioned object, a fourth aspect of the invention includes a feature whereby a boss portion which projects outwardly from an outer surface is integrally formed on the crankcase, the push plug is movably mounted on the boss portion, a recessed portion which receives a free end of the spring member is formed in an intermediate portion of the spring set plate in a state that the recessed portion faces the boss portion in an opposed manner, and the boss portion and the recessed portion are fit into each other in a state that the assembling of the spring set plate is completed.

Still further, to achieve the above-mentioned object, a fifth aspect of the invention includes a feature whereby the positioning portion formed on the crankcase is formed in a fork shape which opens toward the outer surface so as to receive the spring set plate from the outside of the crankcase.

According to the first aspect of the invention, the push plug which pushes the outer race of the rolling bearing in the direction perpendicular to the axis of the crankshaft is arranged in parallel with the crankshaft between the cylinder and the crankshaft, and the outer race of the rolling bearing is resiliently biased such that the outer races are pushed to a side of the bearing hole of the crankcase which receives an explosion force. Accordingly, when a load in a radial direction acts on the rolling bearing due to the explosion combustion of the internal combustion engine, a "play" between the outer race of the rolling bearing and the bearing hole of the crankcase can be surely absorbed and hence, the generation of a hitting sound attributed to the above-mentioned "play" can be largely reduced even in a high-output internal combustion engine which exhibits a high explosion pressure. Further, by arranging the push plug parallel to the crankshaft, not only it is possible to allow a pushing force of the push plug to effectively act on the outer race of the rolling bearing but also the assembling of the "play absorbing means" having the push plug into the crankcase can be easily performed from the outside of the crankcase.

Further, according to the second aspect of the invention, the acting direction of the pushing force which is applied to the outer race of the rolling bearing by the pushing plug can be substantially aligned with the acting direction of the maximum pressure (explosion pressure) which the piston receives and hence, it is possible to allow the pushing force acting on the outer race of the rolling bearing to effectively work as a "play" absorbing load between the rolling bearing and the bearing.

Further, according to the third aspect of the invention, in assembling the "play absorbing means" which is constituted of a push plug, the spring member and the spring set plate into the crankcase, the spring set plate can be positioned in a state that the spring member is held in a free elongation state, that is, in a state that a spring load is not applied. Accordingly, an operator can assemble the "play absorbing means" into the crankcase without compressing the spring member or pushing the spring set plate and hence, the assembling operability can be largely enhanced. Further, the spring set plate includes a bent portion which is bent toward the crankcase side and hence, it is possible to accommodate the bent portion into the positioning portion at the crankcase side without largely projecting the spring set plate from the crankcase whereby a space which the "play absorbing means" occupies for assembling thereof can be reduced.

Further, according to the fourth aspect of the invention, the boss portion formed in the crankcase and the recessed portion of the sprig set plate are fitted into each other in a state that the assembling of the "play absorbing means" is completed and hence, it is possible to accommodate the "play absorbing means" in an outer surface of the crankcase thus preventing portions thereof projecting largely from the crankcase.

Still further, according to the fifth aspect of the invention, the manipulation for positioning the spring set plate with respect to the crankcase is facilitated.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
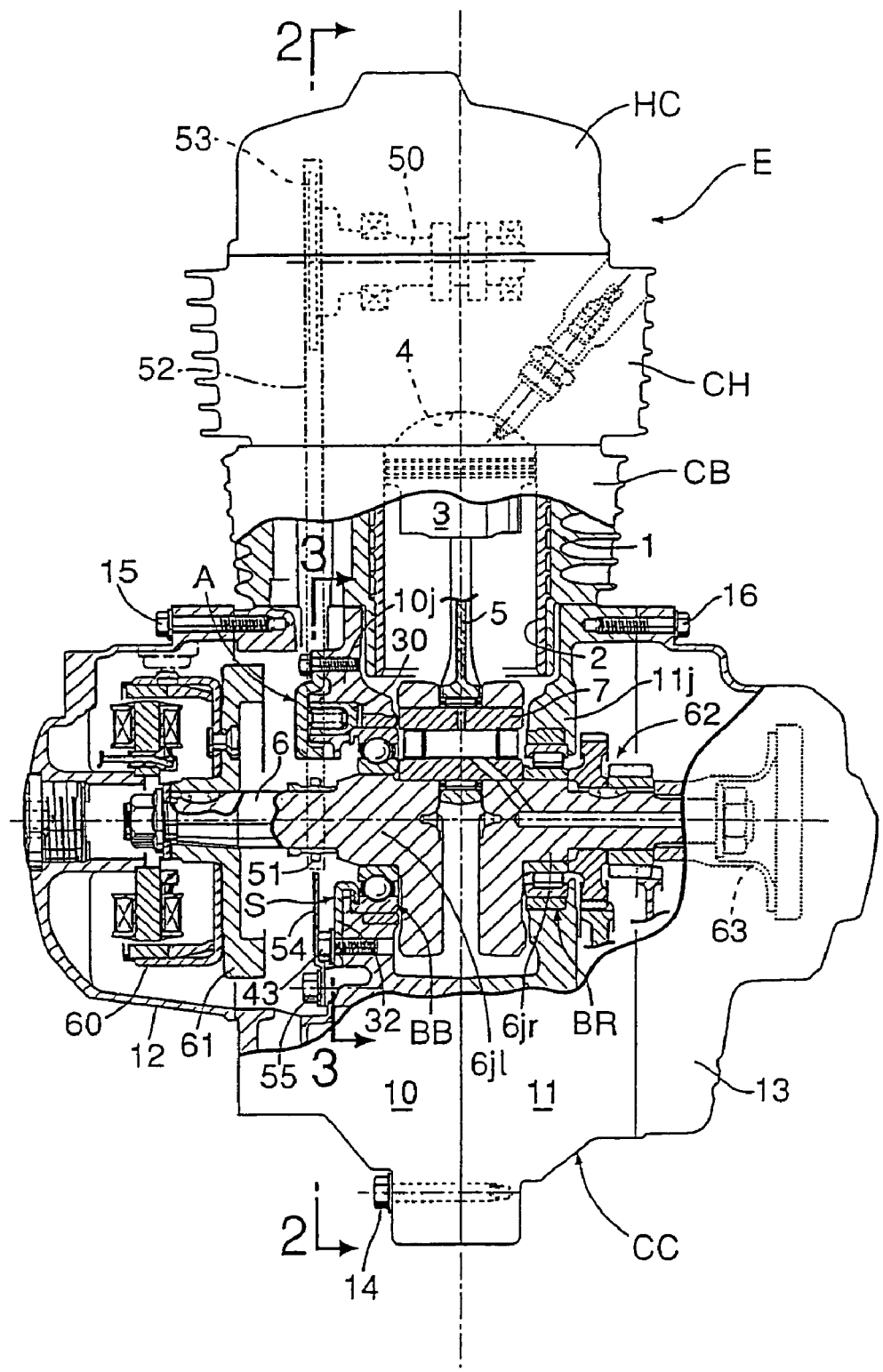
FIG. 1 is a longitudinal cross-sectional side view of an essential part of an internal combustion engine provided with the bearing structure of a crankshaft according to the invention.
Figure 2:
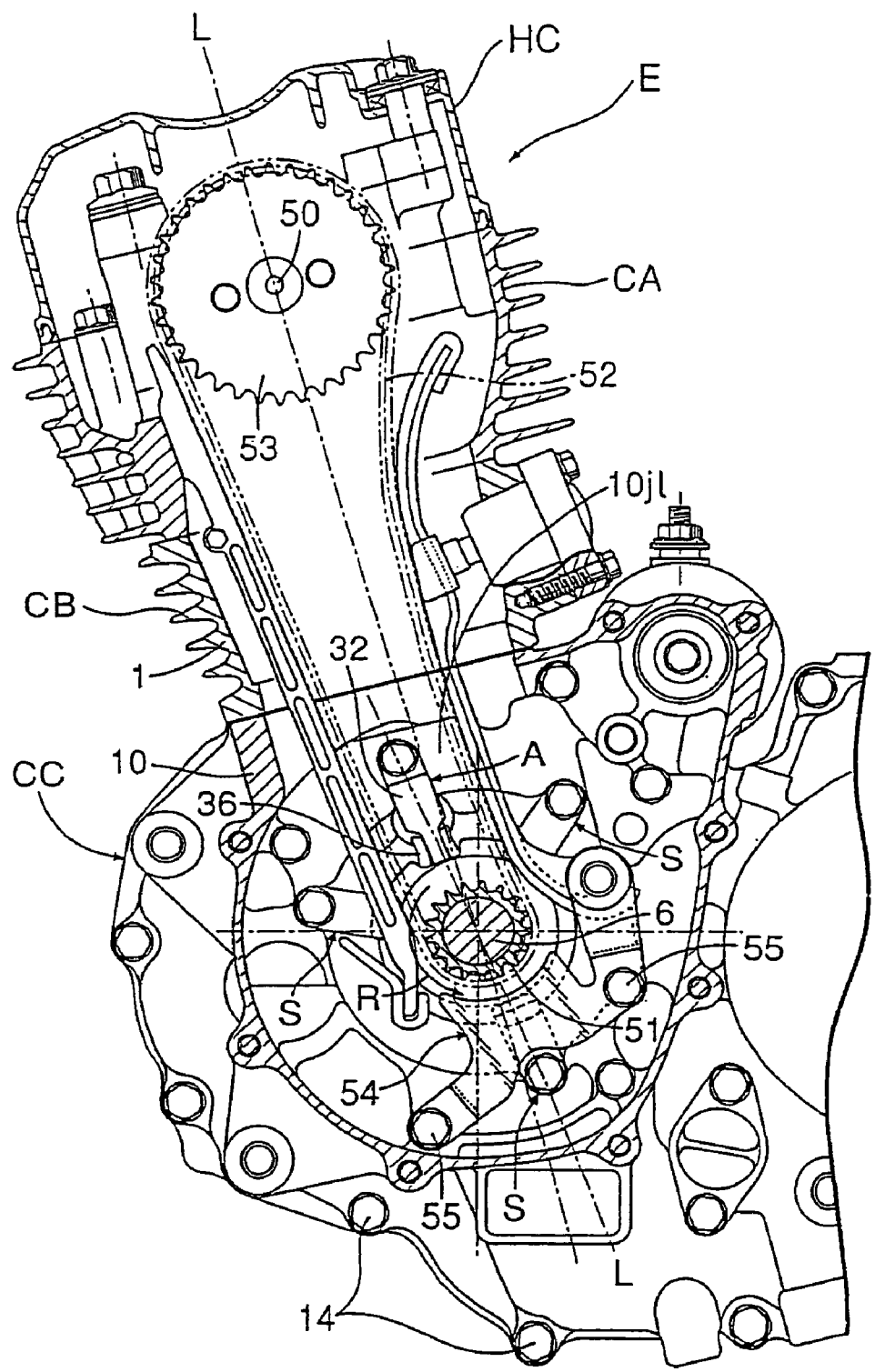
FIG. 2 is a cross-sectional view taken along a line 2—2 in FIG. 1.

First of all, in FIG. 1 and FIG. 2, an OHC type 4-cycle single-cylinder internal combustion engine E includes a cylinder block CB, a cylinder head CH which is fixed to a deck surface of the cylinder block CB, a two (left and right)-split crankcase CC which is fixed to a lower portion of the cylinder head CH, and a head cover HC which is mounted on an upper surface of the cylinder head CH so as to cover the cylinder head CH. In a cylinder 1 having a cylinder sleeve 2 which is formed at a center portion of the cylinder block CB, a piston 3 is slidably fit. A combustion chamber 4 is formed in the cylinder head CH such that the combustion chamber 4 faces a top surface of the piston 3. A small end portion of a connecting rod 5 is rotatably connected to a piston pin of the piston 3, while a large end portion of the connecting rod 5 is rotatably connected to a crankpin 7 of the crankshaft 6. The crankshaft 6 is rotatably supported on the crankcase CC by way of left and right rolling bearings BB, BR described later.

Figure 4:
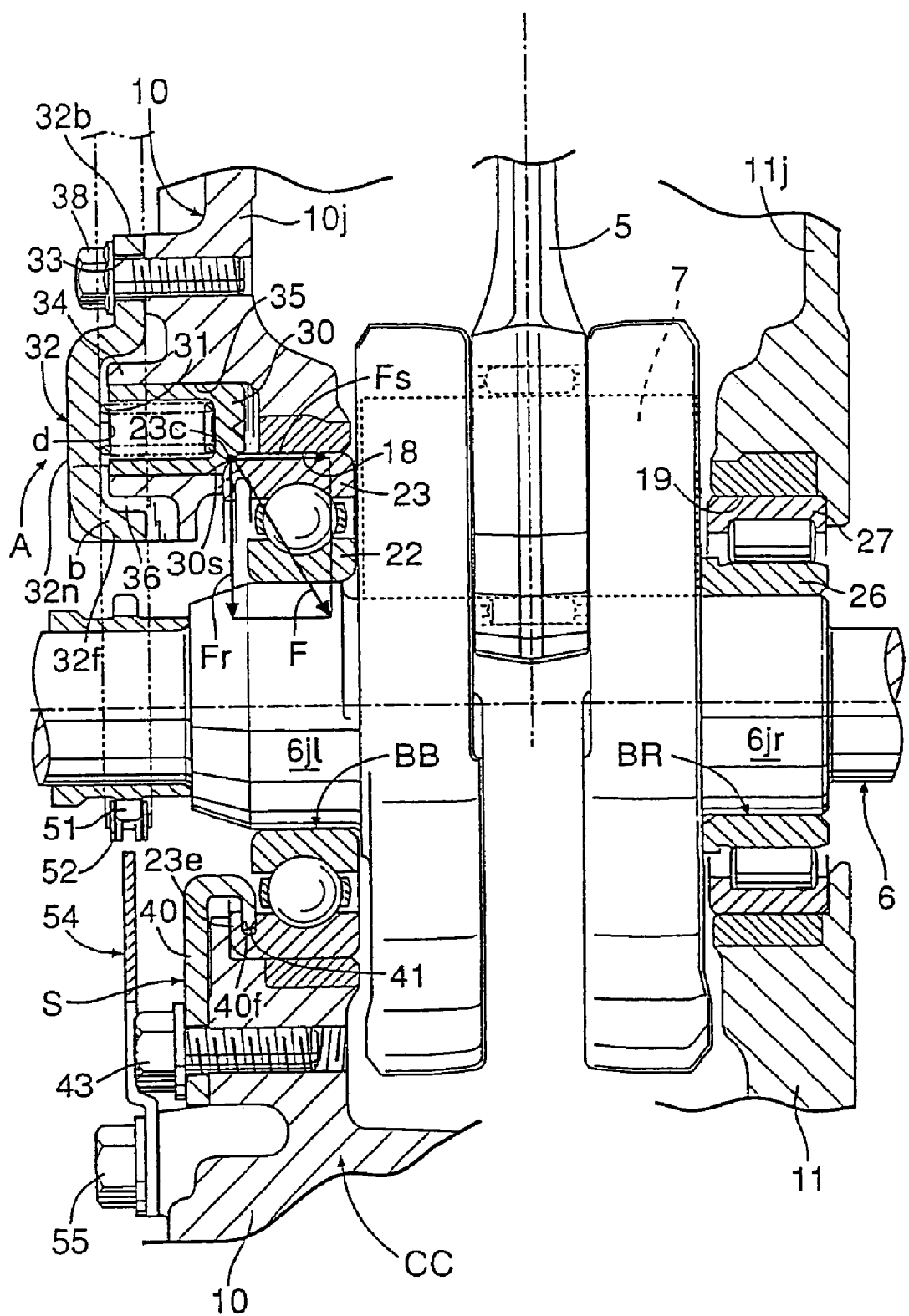
FIG. 4 is a cross-sectional view taken along a line 4—4 in FIG. 3.

The above-mentioned crankcase CC is formed of a cast product made of light alloy of iron, aluminum or the like and is constituted by integrally coupling a left-side crankcase two-split body 10 and a right-side crankcase two-split body 11 using a plurality of bolts 14. An outer surface of an opening of the left-side crankcase two-split body 10 is covered with a left-side cover 12 and the left-side cover 12 is fixed to the outer surface by bolts 15, while an outer surface of an opening of the right-side crankcase two-split body 11 is covered with a right-side cover 13 and the right-side cover 13 is fixed to the outer surface by bolts 16. On the left-side and right-side crankcase two-split bodies 10, 11, left and right journal walls 10j, 11j which face each other with a space therebetween are respectively integrally formed. In these left and right journal walls 10j, 11j, left and right bearing holes 18, 19 (the left bearing hole 18 having a diameter larger than a diameter of the right bearing hole 19) are respectively opened or formed coaxially. Bearing surfaces of these left and right bearing holes 18, 19 are formed by cast rings made of Fe which are cast at the time of casting the crankcase. In the left and right bearing holes 18, 19, left and right journal shaft portions 6jl, 6jr of the crankshaft 6 are rotatably supported by way of left-side and right-side rolling bearings BB, BR. As explicitly shown in FIG. 4, the left-side rolling bearing BB is constituted of a ball bearing and the right-side rolling bearing BR is constituted of a roller bearing. An inner race 22 of the above-mentioned left-side rolling bearing, that is, the ball bearing BB is press-fit in the left journal shaft portion 6jl of the crankshaft 6 and, at the same time, an outer race 23 of the ball bearing BB is loosely fit in the bearing hole 18 of the left journal wall 10j (a slight play in the radial direction). The outer race of the ball bearing BB is more extended outwardly in the axial direction (the direction away from the cylinder axis) than the inner race 22, an engaging groove 41 having a recessed cross-section which constitutes "movement suppressing means S" described later is formed on an inner peripheral surface of an extending portion 23e, and a hook portion 40f of the movement suppressing member 40 is detachably engaged with the engaging groove 41. As shown in FIG. 4, between the above-mentioned engaging groove 41 and the hook portion 40f, a fine gap is defined so as to allow a slight movement of the outer race 23 in the axial direction with respect to the hook portion 40f.

Further, the inner race 26 of the above-mentioned right-side rolling bearing, that is, the roller bearing BR is inserted into the right journal shaft portion 6jr of the crankshaft 6, while an outer race 27 of the roller bearing BR is press-fit into the bearing hole 19 of the right journal wall 11j. Here, after inserting the inner race 26 into the right journal shaft portion 6jr of the crankshaft 6, the fixing of the inner race 26 to the right journal shaft portion 6jr of the crankshaft 6 is performed by collectively fastening together with a gear train 62, a centrifugal filter 63 (see FIG. 1) using a nut from a shaft end of the crankshaft 6.

Figure 3:
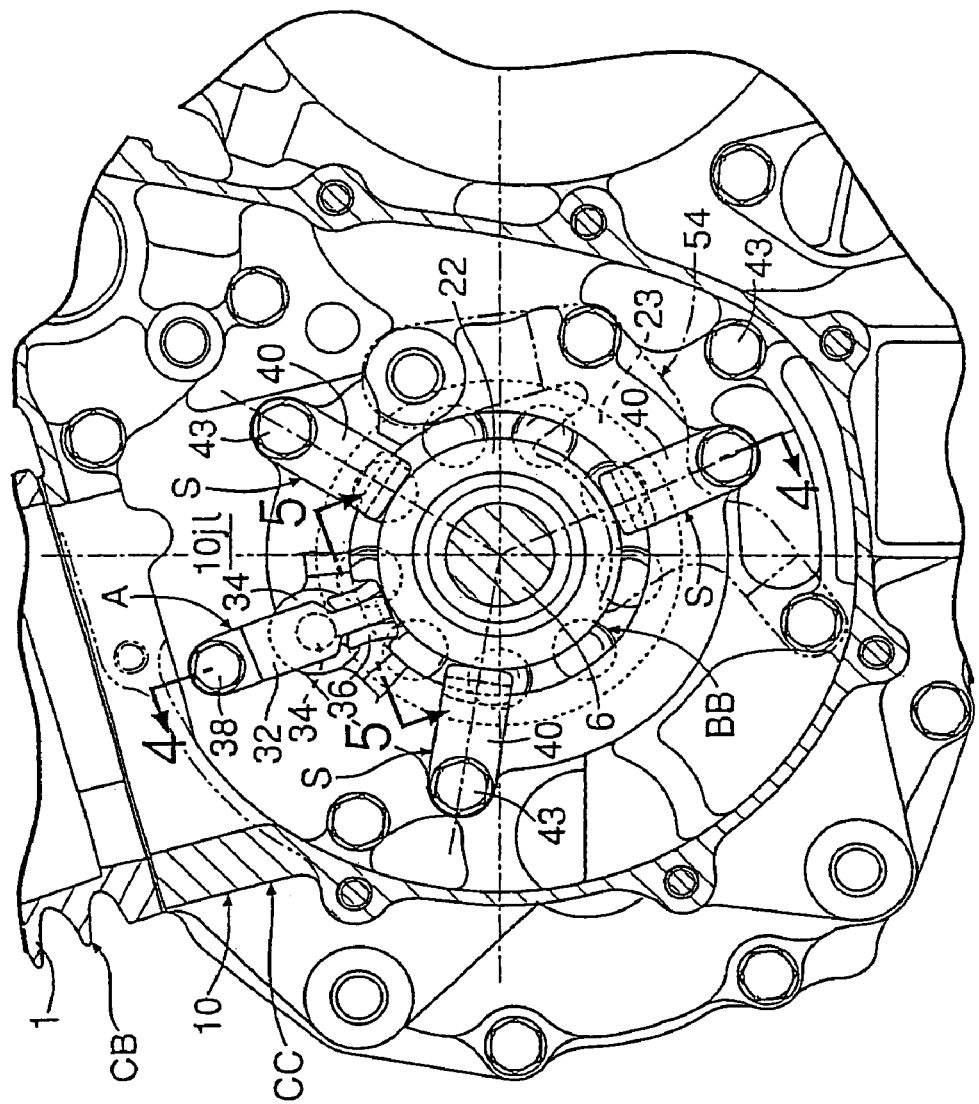
FIG. 3 is an enlarged cross-sectional view taken along a line 3—3 in FIG. 1;.

As shown in FIG. 1 and FIG. 3, between the crankshaft 6 and the cylinder 1, on the left journal wall 10j of the left-side crankcase two-split body 10, "play absorbing means A" which is provided for absorbing a "play" in the radial direction between the outer race 23 of the ball bearing BB and the bearing hole 18 is provided along the axial direction of the crankshaft 6 in a state that the play absorbing means A is arranged close to the outer side of an upper portion of the above-mentioned ball bearing BB.

Figure 6:
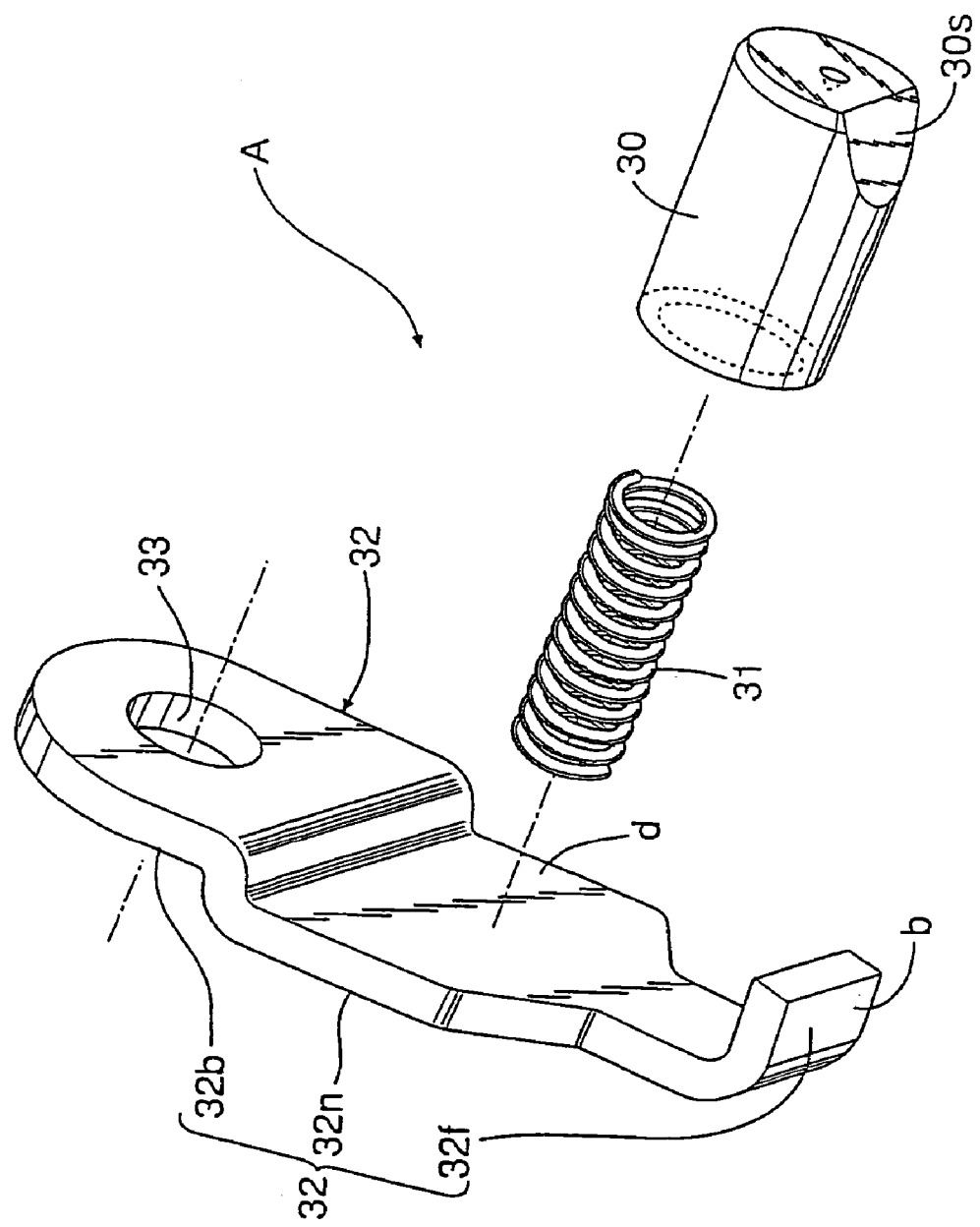
FIG. 6 is a perspective view of a push plug.

The above-mentioned "play absorbing means A" is, as explicitly shown in FIG. 3, FIG. 4 and FIG. 6, constituted of a push plug 30, a coil spring 31 and a spring set plate 32. the push plug 30 is formed in a bottomed hollow cylindrical shape and an inclined surface 30s is formed on a corner portion of the bottomed-side end wall. Further, the push plug 30 is slidably fit in the inside of a cylindrical hole 35 which is formed in a boss portion 34 disposed at an oblique upper position with respect to the ball bearing BB of the left journal wall 10j and has an axis thereof in the axial direction of the crankshaft 6 (the direction perpendicular to the cylinder axis).

Figure 5:
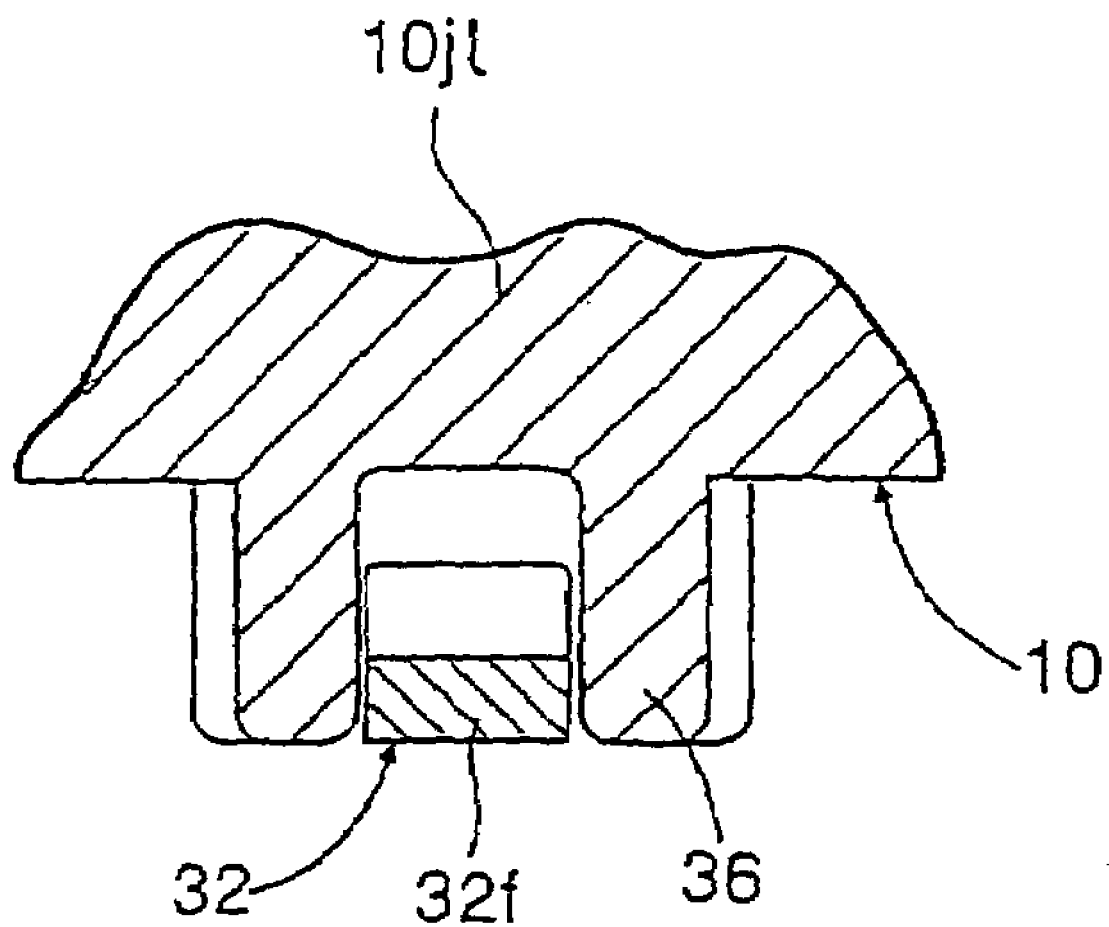
FIG. 5 is an enlarged cross-sectional view taken along a line 5—5 in FIG. 3.

As shown in FIG. 4, a corner portion 23c having a circular cross section of the outer race 23 of the ball bearing BB projects into the inside of the cylindrical hall 35 and the inclined surface 30s of the above-mentioned push plug 30 is brought into contact with the corner 23c. The above-mentioned coil spring 31 is housed in the inside of the push plug 30 and has an outer end thereof projected more outwardly than an end surface of the opening of the push plug 30. The above-mentioned spring set plate 32 is formed in an elongated manner in the radial direction of the crankshaft 6, and includes a proximal portion 32b which forms a bolt hole 33, an intermediate portion 32n having a recessed portion d for receiving spring in an inner surface thereof, and a free end portion 32f having a bent portion b which is folded inwardly, wherein the proximal portion 32b is fixed to an outer surface of the left-side crankcase two-split body 10 using a mounting bolt 38, the recessed portion d for receiving spring formed in the intermediate portion 32n receives an outer end of the above-mentioned coil spring 31, and the above-mentioned free end 32f is formed to have a width narrower than a width of the intermediate portion 32n and is engaged with the inside of a positioning portion 36 having a fork-like cross section (see FIG. 5) which is integrally formed with the left-side crankcase two-split body and is formed in a chevron shape in a side view (see FIG. 2) whereby the rotation of the spring set plate 32 is stopped, that is, the spring set plate 32 can be positioned.

Figure 8:
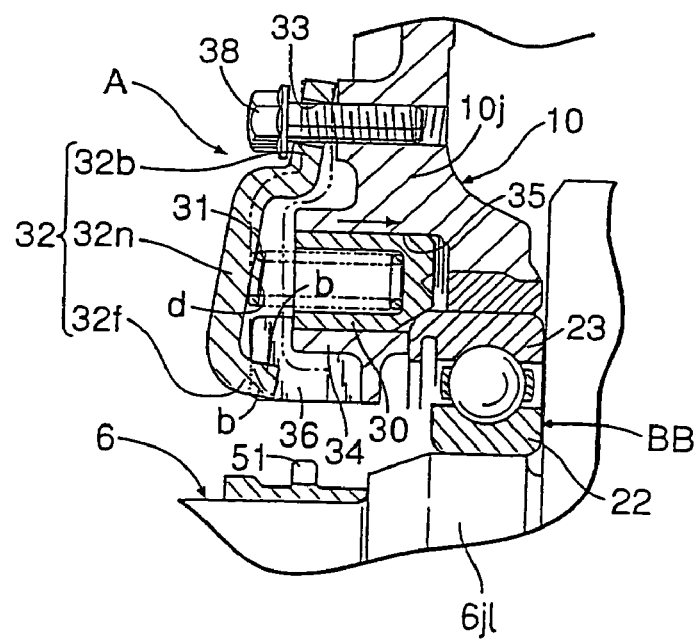
FIG. 8 is an operational view showing a state at the time of assembling the play absorbing means.
Figure 9:
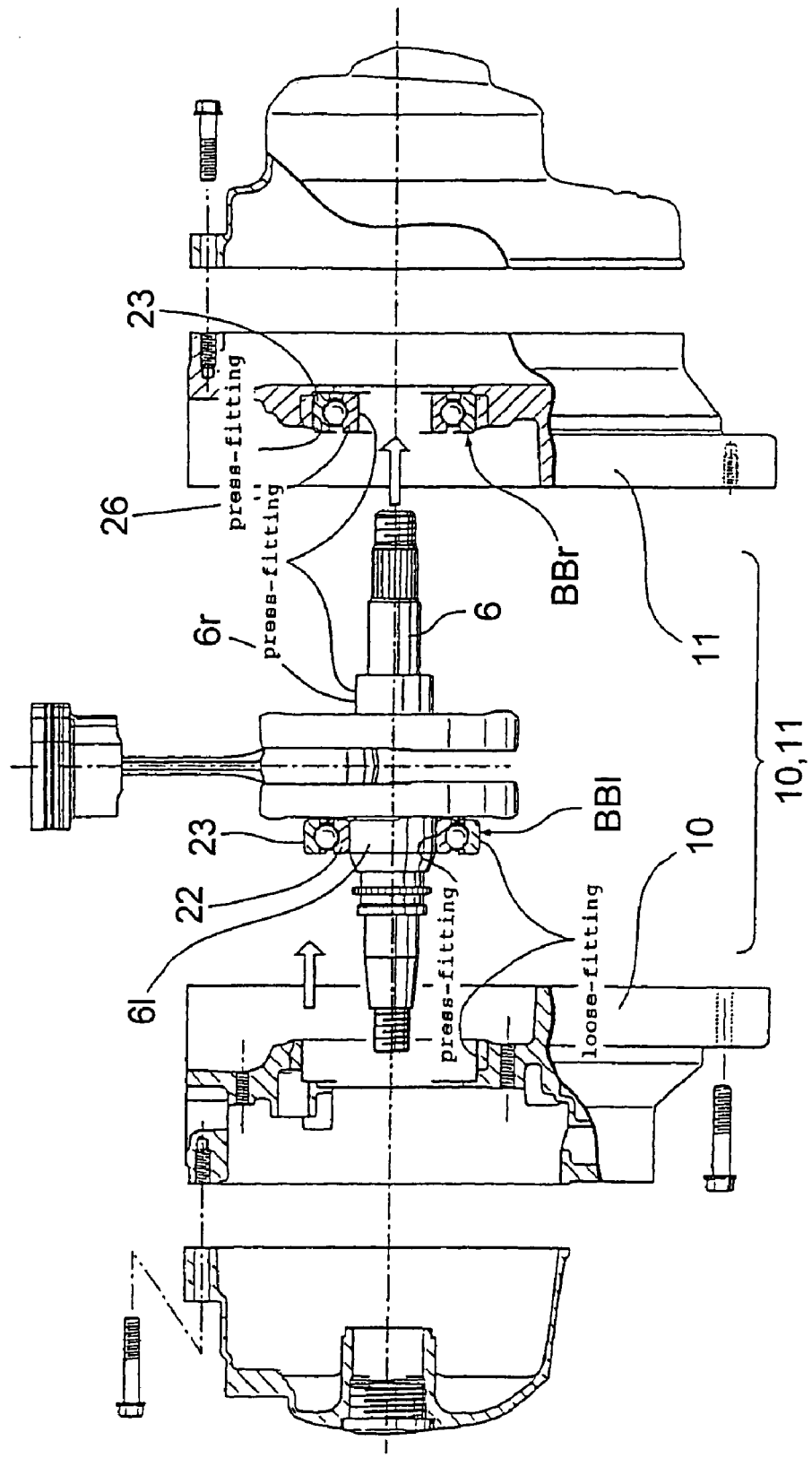
FIG. 9 is a diagram explaining a process of assembling a crankshaft in a crankcase.
Figure 10:
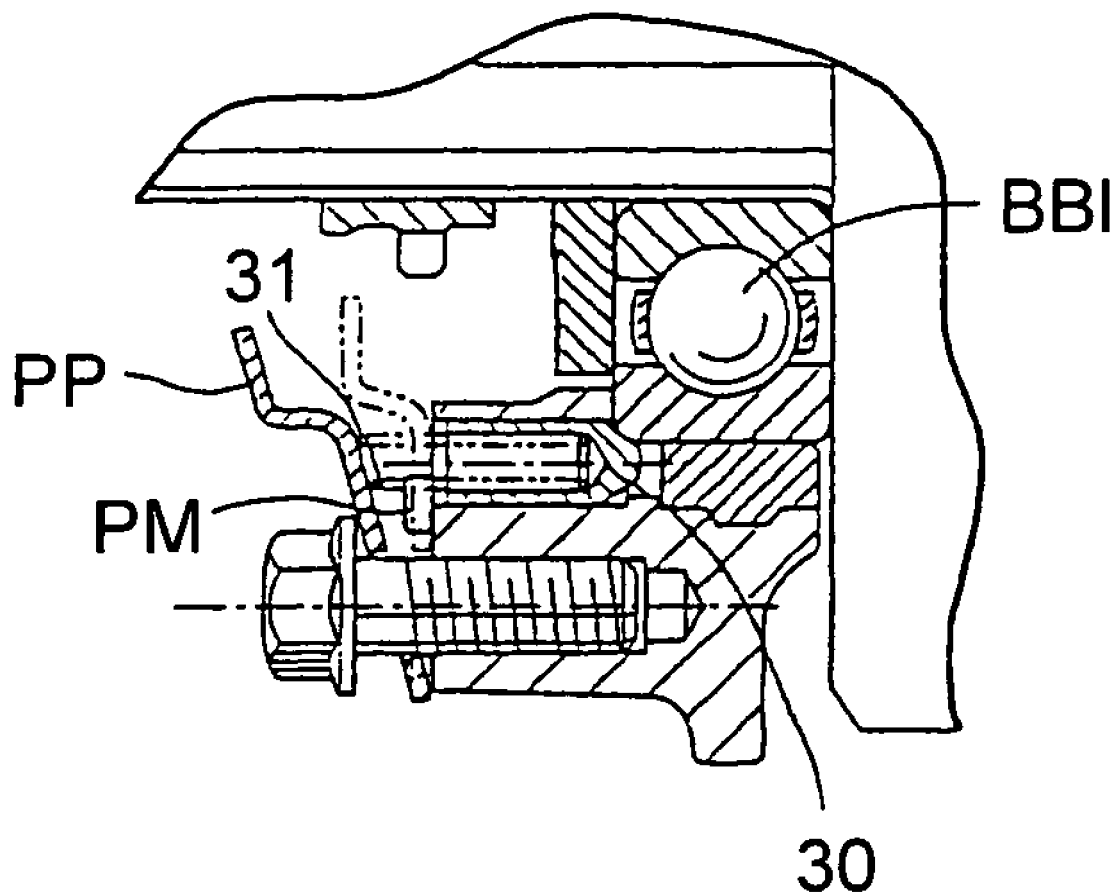
FIG. 10 is an operational view showing a state of assembling conventional play absorbing means.

Here, in assembling the above-mentioned "play absorbing means A" into the left-side crankcase two-split body 10, as shown in FIG. 8, the spring set plate 32 is loosely and temporarily fastened to the left-side crankcase two-split body 10 using the mounting bolt 38. Then, in a state that an end portion of the coil spring 31 having a free elongation length is received by the spring receiving recessed portion d of the intermediate portion 32n, the bent portion b of the free end 32f of the spring set plate 32 is engaged with the fork-shaped positioning portion 36 of the left-side journal wall 10j and hence, it is possible to position the spring set plate 32 while preventing the rotation of the spring set plate 32. Accordingly, an operator can perform the assembling of the "play absorbing means A" without performing cumbersome manipulations such as compressing the coil spring 31 or pushing the spring set plate 32 with his hand to prevent the rotation of the spring set plate 32. Further, by further fastening the mounting bolt 38, as indicated by a chain line shown in FIG. 8, the assembling of the "play absorbing means A" is completed In this assembling completion state, it is possible to allow the boss portion 34 of the left-side crankcase two-split body 10 and the recessed portion d of the intermediate portion 32n of the spring set plate 32 to fit into each other whereby the "play absorbing means A" can be housed in an outer surface of the crankcase 10 in a compact manner and the partial protrusion of the "play absorbing means A" can be prevented. Further, as mentioned previously, since the assembling of the "play absorbing means A" can be performed from the outside of the left-side crankcase two-split body 10, it is possible to obtain the extremely favorable assembling operability.

As shown in FIG. 4, in the assembling completion state of the "play absorbing means A", the spring set plate 32 pushes the push plug 30 inwardly by way of the coil spring 31 and pushes the outer race 23 of the ball bearing BB with an inclined downward pushing force F due to the inclination surface 30s of the push plug 30. Due to a vertical-direction component force Fr of the pushing force F, that is, due to the component force Fr in the radial direction of the crankshaft 6, the outer race 23 is pushed in the radial direction and it is possible to absorb or eliminate the above-mentioned "play" in the radial direction between the outer peripheral surface of the outer race 23 and the bearing hole 18 due to the pushing force whereby it is possible to properly support the crankshaft 6 without a play with respect to the load in the radial direction of the crankshaft 6 due to an explosion force applied to the piston 3 and the occurrence of a hitting sound can be preliminarily prevented.

Further, the acting direction of the pushing force which the above-mentioned "play absorbing means A" applies to the ball bearing BB is substantially aligned with the acting direction of the maximum pressure (explosion pressure) which the piston 3 receives. That is, in this internal combustion engine, the position of the piston which receives the maximum explosion pressure is a position slightly delayed from a top dead center and hence, as shown in FIG. 2, the "play absorbing means A" is disposed at a position slightly offset to the rotational direction (the arrow R direction in FIG. 2, the counterclockwise direction) side than the cylinder axis L—L as viewed from the axial direction of the crankshaft 6 and is disposed in the direction along the cylinder axis L—L. Accordingly, it is possible to make the direction of the pushing force which the "play absorbing means A" applies to the ball bearing BB aligned with the direction of the maximum pressure which the crankshaft 6 receives from the piston 3 thus allowing the ball bearing BB to properly support the crankshaft 6.

Here, the push plug 30 of the above-mentioned "play absorbing member A" is arranged parallel to the crankshaft 6 between the cylinder 1 and the crankshaft 6 and resiliently biases the ball bearing BB such that the ball bearing BB is pushed to the side of the bearing hole 18 of the crankcase 10 which receives the explosion pressure. Accordingly, when the excessive load in the radial direction acts on the ball bearing BB along with the explosion combustion of the internal combustion engine, the "play" between the outer race 23 and the bearing hole 18 of the crankcase 10 can be surely absorbed and hence, it is possible to largely reduce the generation of the hitting sound attributed to the above-mentioned "play" even in the high-output internal combustion engine having the high explosion pressure. Further, by arranging the push plug 30 in parallel to the crankshaft 6, not only it is possible to allow a pushing force of the push plug 30 to effectively act on the outer race 23 of the ball bearing BB but also the assembling of the "play absorbing means A" having the push plug 30 into the crankcase 10 can be easily performed from the outside of the crankcase 10.

Further, the acting direction of the pushing force which the above-mentioned push plug 30 applies to the ball bearing BB is substantially aligned with the acting direction of the maximum pressure (explosion pressure) which the piston 3 receives. That is, in this internal combustion engine, the position of the piston 3 which receives the maximum explosion pressure is a position slightly delayed from a top dead center and hence, as shown in FIG. 2, the "play absorbing means A " is disposed at a position slightly offset to the crankshaft 6 rotational direction (the arrow R direction in FIG. 2, the counterclockwise direction) side from the cylinder axis L—L as viewed from the axial direction of the crankshaft 6 and is disposed in the direction along the cylinder axis L—L. Accordingly, it is possible to make the direction of the pushing force which the "play absorbing means A" applies to the ball bearing BB aligned with the direction of the maximum pressure which the crankshaft 6 receives from the piston 3 and hence, it is possible to make the pushing force which acts on the outer race 23 of the ball bearing BB effectively and efficiently function as the "play" absorbing load between the bearing BB and the bearing hole 18.

Here, as shown in FIG. 4, due to the pushing force F which is applied to the outer race 23 by the push plug 30 of the above-mentioned "play absorbing means A", the component force Fs in the horizontal direction, that is, in the axial direction of the crankshaft 6 is generated. Accordingly, due to this component force Fs, a thrust force in the axial direction is inevitably generated on the outer race 23 and this thrust force acts as a force which moves the outer race 23 of the ball bearing BB in the axial direction.

Here, according to this embodiment, due to the provision of the "movement suppressing means S" described hereinafter, it is possible to receive the thrust force and suppress the movement of the outer race 23 in the axial direction.

Figure 7:
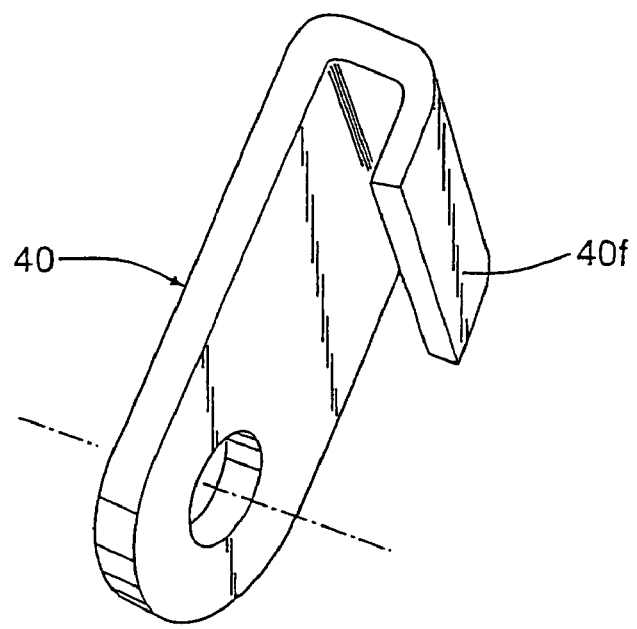
FIG. 7 is a perspective view of a movement suppressing member.

Next, to explain the "movement suppressing means S", the "movement suppressing means S" is constituted of a plurality of (three in this embodiment) movement suppressing members 40 and engaging grooves 41 which are loosely engaged with hook portions 40f of the movement suppressing members 40 and are formed on an inner peripheral surface of the outer race 23 of the ball bearing BB. The movement suppressing member 40 is, as shown in FIG. 7, formed of an elongated plate shape and the hook portion 40f which is bent in a C shape in cross section is integrally formed on a distal end portion of the elongated plate shape. As shown in FIG. 2 and FIG. 3, the above-mentioned three movement suppressing members 40 are arranged radially in an equidistant manner in the circumferential direction outside the left-side crankcase two-split body 10. The movement suppressing members 40 have outer ends thereof fixed to an outer surface of the left-side crankcase two-split body concentrically with the ball bearing BB using the mounting bolts 43. Three movement suppressing members 40 are directed to the center of the ball bearing BB and the hook portions 40f formed on inner ends of the movement suppressing members 40 are bent toward an inner surface of the outer race of the ball bearing BB and are respectively engaged with the engaging grooves 41 formed in the inner surface. Between each hook portion 40f and the engaging groove 41, a slight gap is defined in the axial direction thereof. Due to the engagement of the hook portion 40f and the engaging groove 41, it is possible to suppress the movement of the outer race 23 of the ball bearing BB in the axial direction. As a result, it is no more necessary to make the right-side ball bearing receive the thrust force (the technique described in the above-mentioned Patent Document 1) whereby, as in the case of this embodiment, it is possible to adopt the roller bearing BR having a small diameter (compared with the ball bearing BB) as the right-side rolling bearing. Further, as shown in FIG. 2 and FIG. 3, by arranging the above-mentioned three movement suppressing members 40 in a spaced-apart manner in the circumferential direction of the ball bearing BB, it is possible to prevent the inclination of the ball bearing BB.

The above-mentioned "movement suppressing means S" is constituted of the movement suppressing members 40 which are fixed to the outer surface of the left-side crankcase two-split body 10 and the engaging grooves 41 which are formed on the inner peripheral surface of the outer race 23 of the ball bearing BB and hence, the "movement suppressing means S" has the simple structure whereby in mounting the "movement suppressing means S" on the left-side crankcase two-split body 10, it is unnecessary to adopt mounting shapes such as notches in the left-side crankcase two-split body 10 thus eliminating the possibility that the strength of the left-side crankcase two-split body 10 is decreased. Further, since this "movement suppressing means S" can be mounted from the outside of the left-side crankcase two-split body 10, the assembling can be performed easily and no special facilities and jigs are necessary to perform the assembling.

As shown in FIG. 1 and FIG. 2, to the crankshaft 6 disposed outside the ball bearing BB, a drive sprocket wheel 51 for timing driving of a valve-operating cam shaft 50 is fixed. The drive sprocket wheel 51 is connected with a driven sprocket wheel 53 which is fixed to the valve-operating cam shaft 50 which is rotatably and pivotally supported on the cylinder head CH by way of an endless chain 52. The rotation of the crankshaft 6 is transmitted to the valve-operating cam shaft 50 via the drive sprocket wheel 51, the endless chain 52 and the driven sprocket wheel 53. Below the crankshaft 6, a chain falling prevention plate 54 which prevents the falling of the chain 52 is fixed to the left-side crankcase two-split body 10 using a plurality of bolts 55. The chain falling prevention plate 54 has, as shown in FIG. 2, an arcuate portion which is disposed close to and faces an arcuate lower surface of the chain 52 wound around the drive sprocket wheel 51, wherein the falling of the above-mentioned chain 52 is prevented by this arcuate portion.

In FIG. 1 and FIG. 2, a flywheel 61 which fixes an outer rotor 60 of an ACG thereto is fixed to a left-side end portion of the crankshaft 6, while a gear train 62 and a centrifugal oil filter 63 which are connected with a transmission, a balancer and the like in an interlocking manner are fixed to a right-side end portion of the crankshaft 6.

Next, the manner of operation of this embodiment is explained.

Here, when the internal combustion engine E is operated, the crankshaft 6 which is supported on the crankcase 6 by way of the ball bearing BB and the roller bearing BR is rotatably driven. In such an operation, the "play" in the radial direction which is generated between the outer case 23 of the ball bearing BB and the bearing hole 18 of the left-side crankcase two-split body 10 can be absorbed by the above-mentioned "play absorbing means A". Particularly, the push plug 30 is arranged parallel to the crankshaft 6 between the cylinder 1 and the crankshaft 6 and the outer race 23 of the ball bearing BB is resiliently biased such that the outer race 23 is pushed to the side of the bearing hole 18 of the left-side crankcase two-split body 10 which receives the explosion force and hence, when the load in the radial direction acts on the ball bearing BB due to the explosion combustion of the internal combustion engine, the "play" between the outer race 23 of the bearing BB and the bearing hole 18 of the left-side crankcase two-split body 10 can be surely absorbed. Accordingly, it is possible to largely reduce the generation of the hitting sound attributed to the above-mentioned "play" also with respect to the high-output internal combustion engine with the high explosion pressure. Further, the movement of the outer race 23 of the ball bearing BB in the axial direction which is inevitably present due to the mounting of the above-mentioned "play absorbing means A" can be suppressed by the above-mentioned "movement suppressing means S" and hence, it is possible to form one of the pair of rolling bearings which support the crankshaft 6 using the roller bearing (having the diameter smaller than the diameter of the ball bearing and having high rigidity) whereby the internal combustion engine E can have a compact configuration.

In other words, when the internal combustion engine E is operated, the crankshaft 6 which is supported on the crankcase 6 by way of the ball bearing BB and the roller bearing BR is rotatably driven. In such an operation, the "play" in the radial direction which is generated between the outer race 23 of the ball bearing BB and the bearing hole 18 of the left-side crankcase two-split body 10 can be absorbed by the above-mentioned "play absorbing means A". Accordingly, it is possible to preliminarily prevent the generation of the hitting sound attributed to the above-mentioned "play" and, at the same time, it is possible to ensure the smooth and light rotation of the crankshaft 6 by properly supporting the crankshaft 6 using the above-mentioned bearings BB, BR.

Further, the movement of the outer race 23 of the ball bearing BB in the axial direction which is inevitably present due to the mounting of the above-mentioned "play absorbing means A" can be suppressed by the above-mentioned "movement suppressing means S" and hence, it is possible to form one of the pair of rolling bearings which support the crankshaft 6 using the roller bearing (having the diameter smaller than the diameter of the ball bearing and having high rigidity) whereby the internal combustion engine E can have a compact configuration.

Although the embodiment of the invention has been explained heretofore, the invention is not limited to the embodiment and various embodiments are conceivable within the scope of the invention.

For example, a roller bearing or other rolling bearing may be used in prace of the left-side ball bearing or a needle bearing or other rolling bearing may be used in prace of the right-side roller bearing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bearing structure of a crankshaft in an internal combustion engine comprising a cylinder block and a crankcase which is integrally connected to the cylinder block, wherein a crankshaft which is connected with a piston slidably fitted in a cylinder of the cylinder block by way of a connecting rod in an interlocking manner is rotatably supported in a bearing hole of the crankcase by way of a rolling bearing, the bearing structure comprising:

play absorbing means for preventing a play in the radial direction between the rolling bearing and the bearing hole, wherein the play absorbing means includes a push plug which pushes an outer race of the rolling bearing in the direction perpendicular to an axis of the crankshaft, the push plug being arranged parallel to the crankshaft between the cylinder and the crankshaft, and the outer race of the rolling bearing being resiliently biased toward a side of the bearing hole of the crankcase which receives an explosion pressure, wherein the play absorbing means includes:
a spring set plate which is fixed to the crankcase by a bolt; and
a spring member which is interposed between the push plug and the spring set plate and resiliently biases the push plug toward the outer race,
wherein the spring set plate includes a bent portion which is bent toward the crankcase and the bent portion is, when the spring member is in a free elongation state and the spring set plate is in a temporarily stopped state, engaged with a positioning portion which is formed on the crankcase thus enabling the positioning of the spring set plate.

2. The bearing structure of a crankshaft in an internal combustion engine according to claim 1, wherein the play absorbing means having the push plug is arranged to be offset to a rotational direction front side of the crankshaft from a cylinder center axis of the cylinder.

3. The bearing structure of a crankshaft in an internal combustion engine according to claim 1, wherein a boss portion which projects outwardly from an outer surface is integrally formed on the crankcase, the push plug is movably mounted on the boss portion, a recessed portion which receives a free end of the spring member is formed in an intermediate portion of the spring set plate in a state that the recessed portion faces the boss portion in an opposed manner, and the boss portion and the recessed portion are fit into each other in a state that the assembling of the spring set plate is completed.

4. The bearing structure of a crankshaft in an internal combustion engine according to claim 3, wherein the positioning portion formed on the crankcase is formed in a fork shape which opens toward the outer surface so as to receive the spring set plate from the outside of the crankcase.

5. The bearing structure of a crankshaft in an internal combustion engine according to claim 1, wherein the positioning portion formed on the crankcase is formed in a fork shape which opens toward the outer surface so as to receive the spring set plate from the outside of the crankcase.

6. The bearing structure of a crankshaft in an internal combustion engine according to claim 1, wherein the push plug is formed with a bottomed hollow cylindrical shape, and has an inclined surface formed on a corner portion of a bottomed-side end wall.

7. The bearing structure of a crankshaft in an internal combustion engine according to claim 6, wherein the inclined surface formed on the corner portion of the push plug pushes on the outer race of the rolling bearing.

8. The bearing structure of a crankshaft in an internal combustion engine according to claim 6, wherein the push plug applies a force on the rolling bearing in both an axial direction and a radial direction thereof.

9. The bearing structure of a crankshaft in an internal combustion engine according to claim 1, wherein the push plug is slidably fit inside a cylindrical hole formed in a boss portion disposed at an oblique upper position with respect to the rolling bearing of a journal wall.

10. A bearing structure of a crankshaft in an internal combustion engine in which a crankshaft is rotatably supported on a crankcase by way of a rolling bearing, the bearing structure comprising:

a bearing hole of the crankcase for holding the roller bearing; and play absorbing means interposed between an outer race of the rolling bearing and the crankcase, a play in the radial direction being generated between the outer race of the rolling bearing and the bearing hole of the crankcase being absorbed by the play absorbing means, wherein the play absorbing means includes a push plug which is movably mounted in the crankcase and pushes an outer race of the rolling bearing in a radial direction of the crankshaft, the push plug being arranged parallel to the crankshaft between the cylinder and the crankshaft, and the outer race of the rolling bearing being resiliently biased toward a side of the bearing hole of the crankcase which receives an explosion pressure, wherein the play absorbing means includes:
a spring set plate which is fixed to the crankcase by a bolt; and
a spring member which is interposed between the push plug and the spring set plate and resiliently biases the push plug toward the outer race,
wherein the spring set plate includes a bent portion which is bent toward the crankcase and the bent portion is, when the spring member is in a free elongation state and the spring set plate is in a temporarily stopped state, engaged with a positioning portion which is formed on the crankcase thus enabling the positioning of the spring set plate.

11. The bearing structure of a crankshaft in an internal combustion engine according to claim 10, wherein the play absorbing means having the push plug is arranged to be offset to a rotational direction front side of the crankshaft from a cylinder center axis of the cylinder.

12. The bearing structure of a crankshaft in an internal combustion engine according to claim 10, wherein a boss portion which projects outwardly from an outer surface is integrally formed on the crankcase, the push plug is movably mounted on the boss portion, a recessed portion which receives a free end of the spring member is formed in an intermediate portion of the spring set plate in a state that the recessed portion faces the boss portion in an opposed manner, and the boss portion and the recessed portion are fit into each other in a state that the assembling of the spring set plate is completed.

13. The bearing structure of a crankshaft in an internal combustion engine according to claim 12, wherein the positioning portion formed on the crankcase is formed in a fork shape which opens toward the outer surface so as to receive the spring set plate from the outside of the crankcase.

14. The bearing structure of a crankshaft in an internal combustion engine according to claim 10, wherein the positioning portion formed on the crankcase is formed in a fork shape which opens toward the outer surface so as to receive the spring set plate from the outside of the crankcase.

15. The bearing structure of a crankshaft in an internal combustion engine according to claim 10, wherein the push plug is formed with a bottomed hollow cylindrical shape, and has an inclined surface formed on a corner portion of a bottomed-side end wall.

16. The bearing structure of a crankshaft in an internal combustion engine according to claim 15, wherein the inclined surface formed on the corner portion of the push plug pushes on the outer race of the rolling bearing.

17. The bearing structure of a crankshaft in an internal combustion engine according to claim 15, wherein the push plug applies a force on the rolling bearing in both an axial direction and a radial direction thereof.

18. The bearing structure of a crankshaft in an internal combustion engine according to claim 10, wherein the push plug is slidably fit inside a cylindrical hole formed in a boss portion disposed at an oblique upper position with respect to the rolling bearing of a journal wall.

* * * * *